(12) United States Patent
Reial

(10) Patent No.: US 7,010,019 B2
(45) Date of Patent: Mar. 7, 2006

(54) ASSESSMENT OF DELAY ESTIMATION QUALITY USING INTERFERENCE ESTIMATES

(75) Inventor: Andres Reial, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 631 days.

(21) Appl. No.: 10/246,874

(22) Filed: Sep. 18, 2002

(65) Prior Publication Data

US 2004/0053592 A1 Mar. 18, 2004

(51) Int. Cl.
 *H04K 1/00* (2006.01)
(52) U.S. Cl. ............ 375/148; 375/144; 455/303; 455/296; 370/342
(58) Field of Classification Search ........ 375/144, 375/147, 148, 346; 455/303, 296; 370/342
 See application file for complete search history.

(56) References Cited

U.S. PATENT DOCUMENTS

| 5,818,866 A | 10/1998 | Wilk ............ 375/200 |
| 2004/0052304 A1 * | 3/2004 | Reial ............ 375/148 |
| 2004/0203405 A1 * | 10/2004 | Reial et al. ........ 455/65 |

FOREIGN PATENT DOCUMENTS

| EP | 0 945 995 A2 | 9/1999 |
| EP | 1 067 700 A2 | 1/2001 |
| JP | 10190522 A | 7/1998 |
| JP | 11234172 A | 8/1999 |
| WO | WO01/03309 | 1/2001 |

OTHER PUBLICATIONS

Fukomoto, et al., "Path Search Performance and its Parameter Optimization of Pilot Symbol-Assisted Coherent Rake Receiver for W-CDMA Mobile Radio," IEICE Trans. Fundamentals, vol. E83-A, No. 11, Nov. 2000.
Fukomoto, et al., "Matched-Filter-Based RAKE Combiner for Wideband DS-CDMA Mobile Radio," IEICE Trans. Commun., vol. E81-B, No. 7, Jul. 1998.
Amadei, D., Standard Search Report by European Patent Office, completed May 27, 2003, (4 pgs.).

\* cited by examiner

*Primary Examiner*—Temesghen Ghebretinsae

(57) ABSTRACT

Method and system are disclosed for detecting a situation where it is likely that additional multipath components are available in the channel, but are not included in the RAKE processing. In some embodiments, the invention uses the interference estimates for all RAKE fingers associated with tracked multipath components to detect the fraction of the available signal energy that is captured by the path searcher. The invention provides an activation signal to the path searcher if the fraction of the available power that is captured by the tracked paths falls below a predefined threshold.

20 Claims, 3 Drawing Sheets

ASSESSMENT OF DELAY ESTIMATION QUALITY USING INTERFERENCE ESTIMATES

BACKGROUND OF THE INVENTION

1. Field of the Invention

This invention relates to the detection of multipath components in wireless communication systems and, in particular, to a method and system for optimizing the multipath delay estimation quality based on interference estimates.

2. Description of the Related Art

In code division multiple access (CDMA) and wideband CDMA (WCDMA) mobile communication systems, such as the Universal Mobile Telecommunication System (UMTS), data is transmitted using a spread spectrum modulation technique wherein the data is scattered across the entire range of available frequencies. Each channel is assigned a unique spreading code which is used to spread the data in such a way that only the same code may be used to recover the data. The spreading code is called a pseudo-random noise (PN) code and is composed of a binary sequence of 1's and 0's (or 1's and −1's), called "chips," that are distributed in a pseudo-random manner and have noise-like properties The number of chips used to spread one data bit, or chips/bit, may vary and depends, in part, on the data rate of the traffic channel and the chip rate of the system. To recover the transmitted data, the received signal must be despread with the same spreading code using the same chip rate. Furthermore, the timing of the demodulation must be synchronized, that is, the despreading code must be applied to the received signal at the correct instant in time.

Achieving the proper timing can be difficult due to multipath fading effects where the same transmitted signal travels along multiple paths to arrive at different times at the receiver unit. Referring to FIG. 1, for example, the receiver unit 100 may receive the transmitted signal from a base station 102 on a direct and unobstructed propagation path (Path 1). However, many other propagation paths (e.g., Path 2, Path 3) also exist because, in most cases, the transmit antenna of the base station 102 is not narrowly focused in any given direction. Thus, the same signal may be received again by the receiver unit 100 some time later as the signal is reflected off various objects and obstacles (e.g., a house 104, a building 106) in the surroundings before arriving at the receiver unit 100. Likewise, transmission from the receiver unit 100 to the base station 102 may also experience similar multipath fading effects.

Most CDMA based systems use RAKE receivers that are capable of identifying and tracking the various multipath signals for a given channel. Multipath signals with similar propagation distances may then be combined, depending on the time resolution of the transmission system and the instantaneous phase relationship of the multipath signals, to form a distinct multipath component. Each multipath component is assigned a despreader (RAKE finger) that has a copy of the spreading code, but which copy has been delayed in time relative to the spreading code used for the direct path component. The amount of delay time in the despreader is set to match the path delay of the corresponding multipath component. After despreading, the multipath components from the various despreaders are coherently combined to produce an estimate of the data or symbols being transmitted.

For the above arrangement to be effective, the RAKE receiver requires up-to-date knowledge of the multipath delays of the channel. This knowledge is important in order to maximize the signal-to-interference ratio of the detected multipath signal. In addition, the smaller the number of paths available at the receiver unit, the larger the probability that the detected paths may experience simultaneous deep fade. This utilization of diversity, or lack thereof, may lead to serious and often catastrophic degradation of the block error rate (BLER).

One way to identify the multipath signals is to perform a search for the paths over a whole range of possible despreading delays. The path searching can be performed by transmitting a pilot signal from the base station and applying a series of predefined despreading delays at the receiver unit. Where the predefined delays happen to match the arrival times of the multipath signals, a larger-magnitude channel estimate will result, thus indicating the existence of a multipath component. However, the processing resources and power consumption expenses of frequently executing this path searching routine is usually prohibitive.

Moreover, a path search may not always discover all available paths. Overlooking available paths by the path searcher leads to performance degradation due to various reasons. For example, a lower number of tracked paths at the receiver (utilization of diversity) leads to a higher probability that the path may experience simultaneous deep fade, causing serious and often catastrophic degradation of the block error rate (BLER). In addition, the signal-to-interference ratio (SIR) may be decreased since the paths not detected by the path searcher still act as sources of interference to the other fingers in the RAKE receiver. Further, where transmission power control is used, the increased base station transmission power towards the designated user, due to a low SIR, may increase interference to other users in the network.

A straightforward way to ensure the capture of all available paths is to run the path searcher periodically over the whole range of delays covering the maximum allowed delay spread. However, especially in the case of fast fading, the success in detecting individual multipath components depends on the instantaneous magnitude of the path at the time the searcher is run. This approach will provide good energy capture when the searcher is used fairly often, but is usually not practical because of the power consumption and signal processing resource costs mentioned above. Instead, it would be more efficient to execute the path searcher when a determination has been made that an update is needed based on some objective criteria.

Accordingly, it is desirable to be able to optimize the RAKE receiver performance while avoiding frequent path searcher re-runs. More specifically, it would be desirable to the able to detect a situation where new or additional multipath components are available in a channel, but are not presently included in the RAKE processing, and to activate the path searcher based on the occurrence of such situations.

SUMMARY OF THE INVENTION

The present invention is related to a method and system for determining when it is likely that new or additional multipath components are available in the channel, but are not included in the RAKE processing. In some embodiments, the invention uses interference estimates for all RAKE fingers associated with tracked multipath components to determine the fraction of the available signal energy that is presently captured by the path searcher. If the fraction of the available power that is captured by the tracked paths is below a predefined threshold, the invention activates a path searcher to search for additional multipath components.

In general, in one aspect, the invention is related to a RAKE receiver in a mobile communication system. The receiver comprises a path searcher module capable of searching a channel for multipath components, and a RAKE finger module configured to assign a RAKE finger to each multipath component found by the path searcher module. The receiver further comprises an interference module capable of estimating an average interference over a predefined time interval for each RAKE finger assigned a multipath component. The interference module is also capable of estimating a total interference plus noise for the channel. A control unit in the receiver is configured to control the path searcher module based on the average interference estimates from the interference module. The control unit includes an interference estimation algorithm designed to sum the average interference estimates for the RAKE fingers and determine a figure of merit representing a fractional received signal power for the channel based on the summed average interference estimates and the total interference plus noise estimate. The interference estimation algorithm is further designed to initiate a multipath component search if the figure of merit is below a predefined threshold.

In general, in another aspect, the invention is related to a method of scheduling a multipath search of a channel in a RAKE receiver. The method comprises estimating an average interference over a predefined time interval for each RAKE finger assigned a multipath component, and summing the average interference estimates from the RAKE fingers. A total interference plus noise is also estimated for the channel. The method further comprises determining a figure of merit representing a fractional received signal power for the channel based on the summed average interference estimates and the total interference plus noise estimate. A multipath search is then initiated if the figure of merit is below a predefined threshold.

It should be emphasized that the term comprises/comprising, when used in this specification, is taken to specify the presence of stated features, integers, steps, or components, but does not preclude the presence or addition of one or more other features, integers, steps, components, or groups thereof

BRIEF DESCRIPTION OF THE DRAWINGS

A more detailed understanding of the method and system of the present invention may be had by reference to the following detailed description when taken in conjunction with the drawings, wherein.

DETAILED DESCRIPTION OF THE INVENTION

Figure 1:
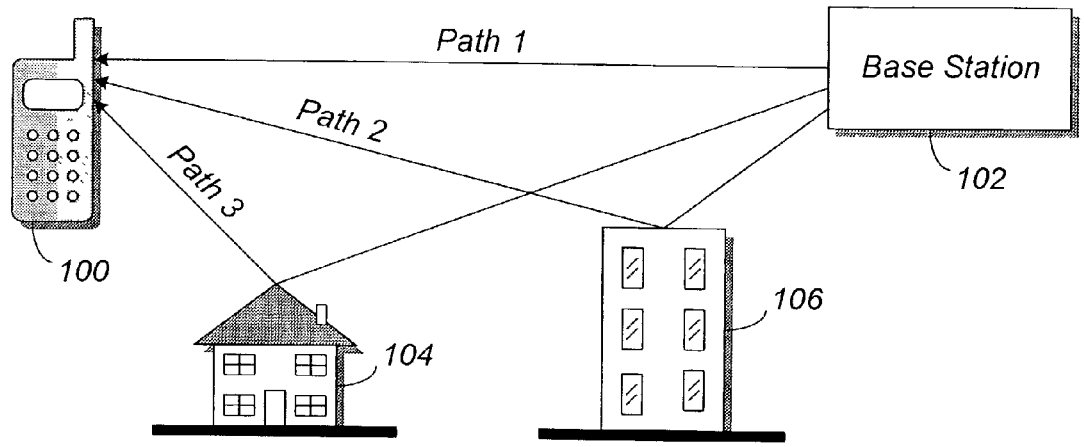
FIG. 1 illustrates various exemplary multipath propagation paths.

Following is a detailed description of the drawings wherein reference numerals for the same and similar elements are carried forward.

Embodiments of the invention provide a method and system for determining when it is likely that additional multipath components are available in the channel, but are not presently included in the RAKE processing. In some embodiments, the average interference power estimates from each RAKE finger presently being used to track a multipath component are added together. This sum is thereafter divided by the total interference estimate to arrive at an interference ratio. The interference ratio is then processed to produce a figure of merit that approximates the ratio of the power that is presently captured by the tracked paths to the total signal power available from the channel. This fractional received signal power is then compared to a predefined threshold. If the comparison indicates that significant unused power may be available, a path searcher is activated to locate paths that are not being tracked.

Figure 2:
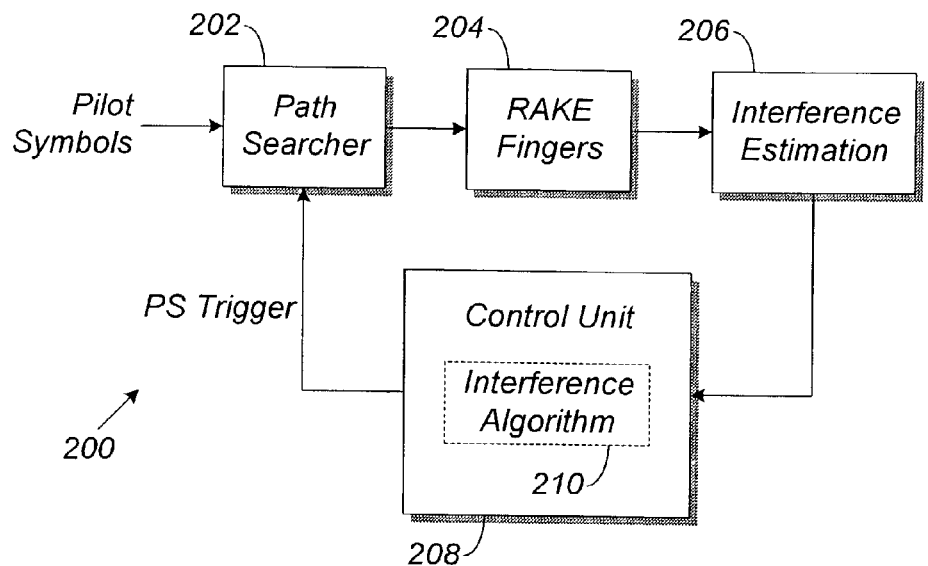
FIG. 2 illustrates a functional block diagram of a delay estimation quality assessment system according to embodiments of the invention.

Referring now to FIG. 2, a pertinent portion 200 of a RAKE receiver according to some embodiments of the invention is shown. The RAKE receiver includes a path searcher 202, a RAKE fingers module 204, an average interference estimation module 206, and a control unit 208. The path searcher 202, RAKE fingers module 204, and average interference estimation module 206 represent elements commonly found in a typical RAKE receiver, and therefore their operation will be described only briefly here The task of the path searcher module 202 is to search for multipath components that may exist in the channel in the manner described previously. This task is performed, in part, by scanning the channel using a number of predefined spreading delays. When a multipath component is found, it is assigned to be tracked by one of several RAKE fingers controlled by the RAKE fingers module 204. The output of each finger, after despreading, is combined with the outputs of other fingers to reproduce the transmitted signal. Typically, one finger is assigned to track one multipath component. More importantly, the multipath component tracked by some fingers will be stronger than the multipath component tracked by other fingers. Accordingly, the output of some fingers will be given more influence or weight than those of other fingers during the combining process. As part of the process of determining the proper weight to be given to each tuning finger, the average interference module 206 estimates the average interference power for each finger. The average interference module 206 thereafter provides the average interference power estimates to the control unit 208 for further processing.

In some embodiments, the control unit 208 includes a signal interference estimation algorithm 210 that processes the average interference power estimates provided by the average interference module 206. The interference estimation algorithm 210 determines, based on the average interference power estimates, whether it is likely that new or additional multipath components in the channel are not being tracked. If so, the interference estimation algorithm 210 causes a trigger signal to be sent to the path searcher module 202 to initiate a path search of the channel. Such an arrangement allows the resources of the RAKE receiver to be optimized by selectively executing the path searcher and associated resources when it appears that unused signal power is available in the channel Operation of the interference estimation algorithm 210 will be described with respect to FIG. 3.

Figure 3:
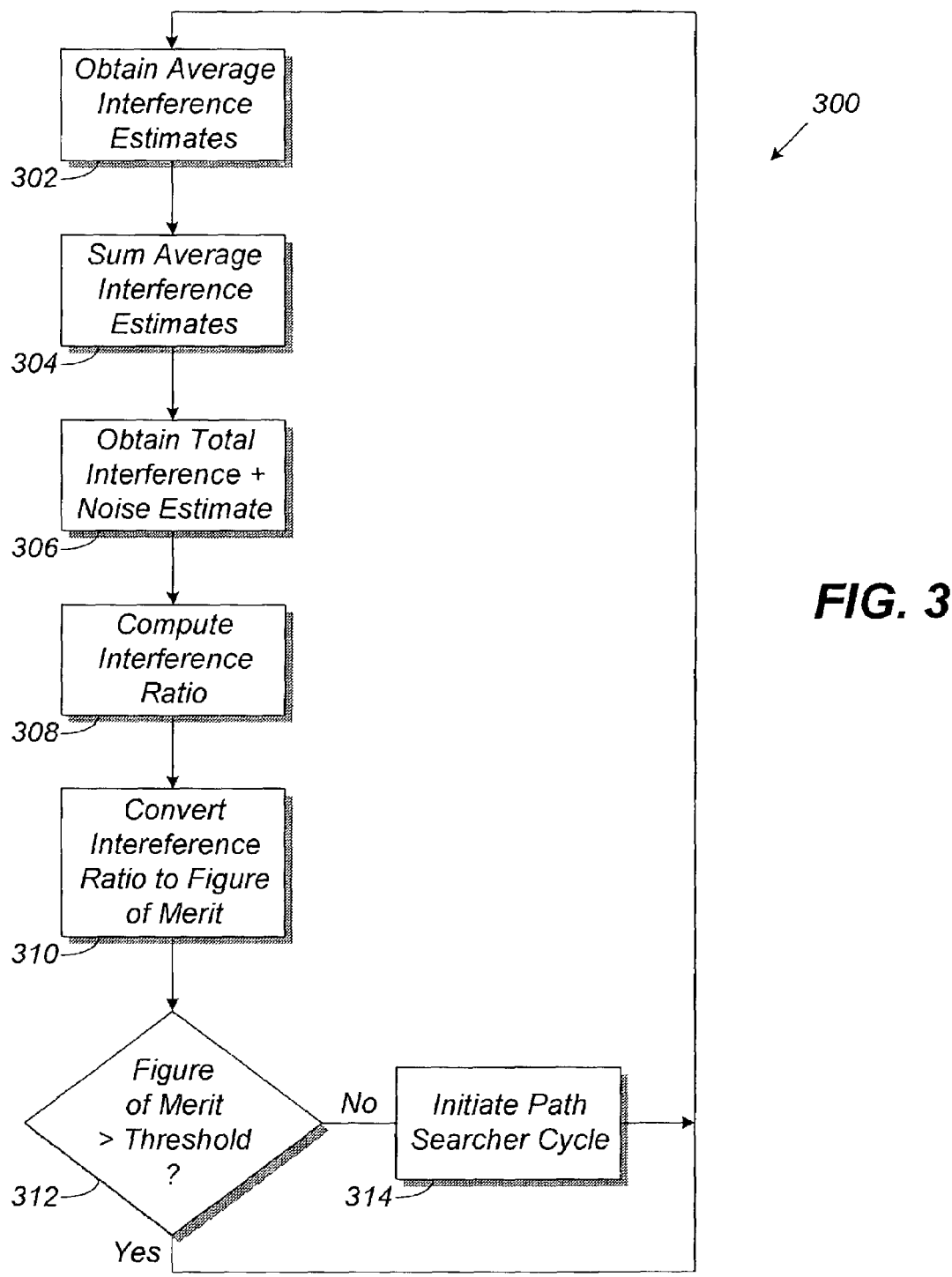
FIG. 3 illustrates a method of assessing delay estimation quality according to embodiments of invention.

FIG. 3 illustrates a method 300 that may be used by the algorithm 210 according to some embodiments of invention. The method 300 begins at step 302 by obtaining an average interference power estimate from each RAKE finger assigned to a multipath component. In some embodiments, the average interference power estimates may be obtained over some predefined time interval such as a single path search cycle. In other embodiments, however, longer or shorter time intervals may be more desirable depending on the particular needs of the application. At step 304, the algorithm adds the average interference power estimates together to obtain a total average interference power estimate associated with the tracked paths. At step 306, the algorithm obtains the total noise plus interference power estimate associated with the full channel structure, which takes into account the interference created by all physical paths. The total interference plus noise power estimate may be obtained using, for example, a tuning finger that is tuned to a spreading delay where no multipath component is known to exist for the channel, or by some other method known in the art.

At step 308, the algorithm computes an interference ratio using the sum of the average interference power estimates over the total noise plus interference power estimate. At step 310, the algorithm converts the interference ratio to a figure of merit, referred to herein as a fractional received signal power, that approximates the ratio of the power that is presently captured by the tracked paths to the total signal power available from the channel. A comparison is made at step 312 to determine whether the figure of merit (fractional received signal power) is above a certain predefined threshold. A "No" answer indicates it is likely that significant signal power representing new or additional multipath components is available in the channel to be captured. In that case, the algorithm initiates a path searcher cycle at step 314. A "Yes" answer indicates it is unlikely that any significant signal power remains available to be captured in the channel.

Figure 4:
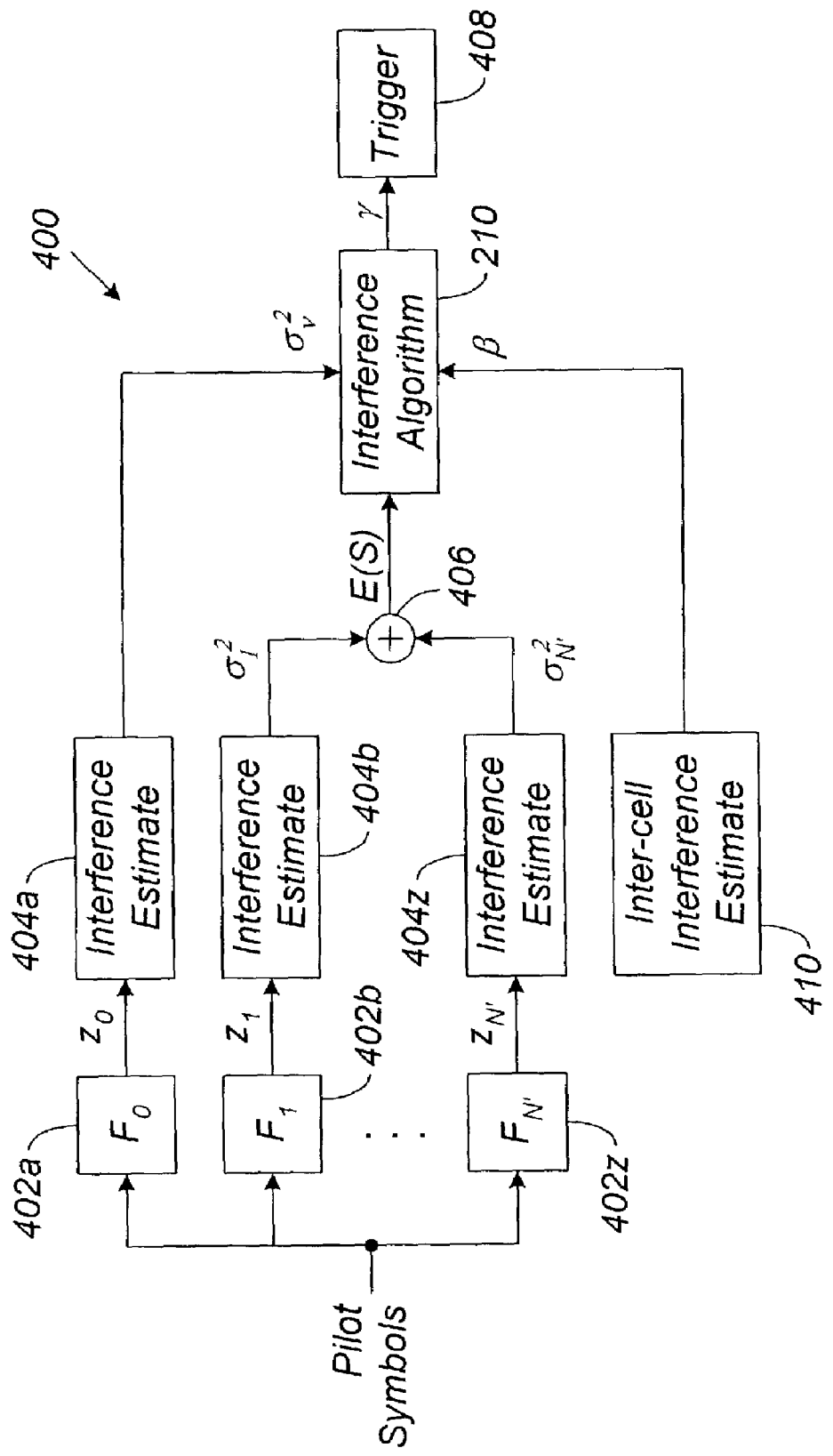
FIG. 4 illustrates a simplified flow diagram of a delay estimation quality assessment system according to embodiments of the invention.

The above method is graphically depicted in FIG. 4 as a system 400, wherein a plurality of RAKE fingers 402a–z are shown. In the system 400, the number of multipath components presently assigned a RAKE finger is N' out of a total of N available multipath components in the channel. An average interference power estimate 404a–z, represented by $\sigma_1^2 \ldots \sigma_{N'}^2$, are obtained from each RAKE finger, $F_1 \ldots F_{N'}$. This is done as part of the normal operation of the RAKE receiver, wherein the average interference power is estimated at each finger to allow computing of the optimal weight to be used for combining the output of a tuning finger with that of other fingers. The interference power may be estimated, for example, by using pilot symbols, data-aided methods, and other approaches well known in the art. The average interference power estimates 404a–z, $\sigma_1^2 \ldots \sigma_{N'}^2$, are thereafter summed together at a summing node 406 to produce a total average interference power estimate. The total average interference power estimate is denoted by E[S], where S is the sum of the average interference power estimates and E[] is the expected value of S when a large number of pilot symbols are transmitted over time (essentially, a time average).

The above total average interference power estimate E[S] is subsequently provided to the interference estimation algorithm 210. The interference estimation algorithm 210 divides the total average interference power estimate E[S] by the total noise plus interference power estimate $\sigma_v^2$ for the channel. The total noise plus interference power estimate $\sigma_v^2$ may be computed using, for example, a tuning finger $F_0$ that is tuned to a delay where no multipath component is known to exist for the channel, or by some other method known in the art.

The ratio of E[S] over $\sigma_v^2$, denoted by $\zeta$ herein, is then processed by the interference estimation algorithm 210 to arrive at the figure of merit (fractional received signal power), denoted by $\gamma$ herein. The figure of merit $\gamma$ approximates the ratio of the power that is presently captured by the tracked paths to the total signal power available from the channel. This figure of merit $\gamma$ is then compared by the interference estimation algorithm 210 to a predefined threshold. If the comparison indicates that significant unused signal power may be available in the channel, a trigger signal 408 is provided to the path searcher. The trigger signal 408 is then used to activate the path searcher in order to locate any paths that are not being tracked.

In some embodiments, a fractional portion of an inter-cell interference power 410, denoted as $\beta$, may also be used to influence the interference ratio mentioned above. The inter-cell interference power fraction $\beta$ may be estimated as a ratio of the inter-cell interference power plus AWGN (additive white gaussian noise) power over the total noise plus interference power $\sigma_v^2$, as will be explained later herein.

A more detailed description of the interference estimation algorithm of the present invention will now be described (with reference made to the system depicted in FIG. 4). Let the desired user signal be composed of complex modulated symbols u and complex spreading sequence $c_j$, with spreading gain M at unit power. The base station (not expressly shown) also transmits to K other users or physical channels, with symbols $v^{(k)}$, spreading codes $$d_j^{(k)},$$

and relative gain $p^{(k)}$. Further, let the multipath channel include N paths, each with a delay $\Delta_l$, and a complex path gain $\alpha_l$. The AWGN at the receiver is denoted by $n_j$, such that $E[n_j n^*_j] = \sigma_n^2$. This equation is essentially an expression of the variance, or average power, of the AWGN component, where $\sigma_n^2$ represents the receiver noise plus inter-cell interference component contained in the total noise plus interference power $\sigma_v^2$ in the channel. Then the transmitted signal can be expressed as the desired user signal plus a sum of the K interfering user signals:

$$x_j = uc_j + \sum_{k=1}^{K} p^{(k)} v^{(k)} d_j^{(k)} \qquad (1)$$

The received signal can be similarly expressed as a sum of several copies of the transmitted signals, time-shifted and weighted due to the multiple (N) propagation paths, combined with the receiver noise plus inter-cell interference (represented collectively as $n_j$):

$$r_j = \sum_{i=1}^{N} x_{j-\Delta_i} a_i + n_j \qquad (2)$$

Now consider an idealized RAKE finger for the m-th path where the delay $\Delta_m$ is known and can be compensated for. After despreading, the output of the m-th finger, $F_m$, becomes:

$$z_m = \sum_{j=1}^{M} r_{j+\Delta_m} c_j^* \quad (3)$$

$$= u a_m \sum_j c_j c_j^* + u \sum_{i \neq m} a_i \sum_j c_{j-\Delta_i+\Delta_m} c_j^* +$$

$$\sum_k p^{(k)} v^{(k)} \sum_i a_i \sum_j d^{(k)}_{j-\Delta_i+\Delta_m} c_j^* + \sum_j n_{j+\Delta_m} c_j^*$$

The terms in Equation (3) correspond to the desired signal, self-interference, intra-cell interference, and noise, respectively. In order to simplify Equation (3), a few assumptions can be made. First, the power of the transmitted symbols u and $v^{(k)}$ and the spreading sequence c and $d^{(k)}$ can be chosen arbitrarily, since they only affect the result through a scaling factor. Therefore, letting $|u|^2=|v^{(k)}|^2 =1$ allows some of the terms in Equation (3) to be omitted and other terms to be collected.\

Next, letting the spreading sequences be random with zero mean and unit power, $$|c_j|^2 = |d_j^{(k)}|^2 = 1,$$

also allows these terms to be omitted and other terms to be collected. The spreading sequence can be assumed to have a zero mean based on its known design and certain noise-like properties.

Assume further that the minimal path spacing is limited to one chip period, that is, $|\Delta_i-\Delta_m|\geq T_c$, where $\Delta_i-\Delta_m$ is the spacing between delays and $T_c$ is the chip period. Such an assumption is usually made in many delay estimation systems because allowing closer spacing does not add significant information after despreading. Moreover, the assumption allows the auto—and cross-correlation functions for the shifted spreading sequences to be assigned the average value 1/M regardless of the shifted amount. The effect is, again, to be able to omit or collect certain quantities in the sum terms of Equation (3).

Finally, let the shifted copies of the spreading sequences be uncorrelated so that $E[c_{j-\Delta}c_j]=0 \forall \Delta \neq lMT_c$. The uncorrelated property $E[c_{j-\Delta}c_j]=0$ is known from the spreading code construction for any practical CDMA systems. Similarly, let $$E[d^{(k)}_{j-\Delta}c_j] = 0 \forall \Delta \neq lMT_c,$$

and note that the downlink channelization codes are orthogonal such that $$\sum_{j}^{M} = d_k^{(k)} c_j^* = 0.$$

With the foregoing assumptions, the output of the m-th finger from Equation (3) can be simplified as:

$$z_m = uMa_m + \sum_{i \neq m} a_i \left( u \sum_j c_{j-\Delta_i+\Delta_m} c_j^* + \sum_k p^{(k)} v^{(k)} \sum_j d^{(k)}_{j-\Delta_i+\Delta_m} c_j^* \right) + \quad (4)$$

$$\sum_j n_{j+\Delta_m} c_j^*$$

From the above, one can find that the expected value for the m-th finger output can be expressed by $E[z_m]=uMa_m$, and the noise plus interference power for the m-th finger can be found from the variance:

$$\text{var}[z_m] = \sigma_v^2 - M|a_m|^2 \left(1 + \sum_k |p^{(k)}|^2 |v^{(k)}|^2 \right) \quad (5)$$

where $\sigma_v^2$ represents the total noise plus interference power for the channel and can be expressed as follows:

$$\sigma_v^2 = M \left( \sum_i |a_i|^2 \left(1 + \sum_k |p^{(k)}|^2 |v^{(k)}|^2 \right) + \sigma_n^2 \right) \quad (6)$$

This total interference plus noise power $\sigma_v^2$ can be evaluated, for example, by a despreader (finger) tuned to a delay where no path is present, denoted in FIG. 4 by $F_0$. The output of $F_0$ is given by:

$$z_0 = \sum_{i=1}^{N} a_i \left( \sum_j c_{j-\Delta_i} c_j^* + \sum_k p^{(k)} v^{(k)} \sum_j d^{(k)}_{j-\Delta_i} c_j^* \right) + \sum_j n_j c_j^* \quad (7)$$

with $E[z_0]=0$ and $E[|z_0|^2]=\sigma_v^2$ from Equation (5)

In Equation (3), the contributions due to self-interference, intra-cell interference, and receiver noise are specified by the second, third, and fourth terms, respectively, on the right-hand side of the equation. No explicit term for the inter-cell interference is present. However, since the level of inter-cell interference is independent of the particular delay selection for the current cell, the inter-cell interference has equal expected power for all fingers and is therefore included in the receiver AWGN term $n_j$.

The statistical behavior of the intra-cell interference term differs significantly from the noise plus inter-cell interference behavior component whose power is expected to have less variability in time and no direct correlation to the path fading and delay selection in the current cell. These statistical and correlation features differentiate the intra-cell interference, $$\sum_i |a_i|^2 \left(1 + \sum_k |p^{(k)}|^2 |v^{(k)}|^2 \right),$$

from the AWGN noise component, $\sigma_n^2$, and allow a fraction of each term represented in Equation (6) to be estimated. Such estimation methods are known in the art and will not be described here. Using such methods, the relationship between the intra-cell interference and the AWGN noise component $\sigma_n^2$ can be expressed as:

$$\sigma_n^2 = \beta \sum_i |a_i|^2 \left(1 + \sum_k |p^{(k)}|\,|v^{(k)}|^2\right) \quad (8)$$

where $\beta$ represents a fractional portion of the receiver noise plus inter-cell interference over the total interference plus noise power. The quantity $\beta$ can be derived from a statistical analysis of the receiver noise variations.

Now, assume that there are N' detected multipath components out of N available multipath components, and for each one of the N' paths, the despreader output $z_m$ can be expressed using Equation (4). Furthermore, consider the quantity.

$$S = \sum_{m=1}^{N'} |z_m - E[z_m]|^2 \quad (9)$$

where S is the sum of the average interference power estimates mentioned above and can be computed from the received data. Using the variance of $z_m$ from Equation (5) and realizing that the noise processes (e.g., the last terms in Equations (4) and (7)) for different despreaders and the spreading sequences are all uncorrelated, one can deduce that the expected value of S is:

$$E[S] = N'\sigma_v^2 - M\sum_{m=1}^{N'} |a_m|^2 \left(1 + \sum_k |p^{(k)}|^2 |v^{(k)}|^2\right) \quad (10)$$

Next, an interference ratio can be computed using the expected value E[S] and the total noise plus interference power $\sigma_v^2$ for the channel as:

$$\varsigma = \frac{E[S]}{\sigma_v^2} = N' - \frac{M\sum_{m=1}^{N'} |a_m|^2 \left(1 + \sum_k |p^{(k)}|^2 |v^{(k)}|^2\right)}{M\left((1+\beta)\sum_{i=1}^{N} |a_i|^2 \left(1 + \sum_k |p^{(k)}|^2 |v^{(k)}|^2\right)\right)} \quad (11)$$

where $\varsigma$ is the interference ratio as it is referred to herein. Simplifying the equation allows the fraction of the received signal power to be computed as:

$$\frac{\sum_{m=1}^{N'} |a_m|^2}{\sum_{i=1}^{N} |a_i|^2} = (1+\beta)(N' - \varsigma) = \gamma, \quad (12)$$

where the value of $\varsigma$ from Equation (5) (i.e., E[S] over the total noise plus interference power $\sigma_v^2$) can be estimated at the receiver. In Equation (12), the variable $\gamma$ represents fractional received signal power, which is a figure of merit that approximates the ratio of the signal power that is presently captured by the tracked paths and the total signal power available from the channel. Note that Equation (12) is but one way to determine the figure of merit $\gamma$, and that other methods exist and may certainly be used without departing from the scope of the invention.

Now, if one assumes that there are L pilot symbols available, then E[S] can be written as:

$$\hat{E}[S] = \sum_{m=1}^{N'} \hat{\sigma}_m^2 = \sum_{m=1}^{N'} \frac{1}{L}\sum_{l=1}^{L} |z_m^{(l)} - \hat{\mu}_m|^2 \quad (13)$$

where the caret denotes an estimated value based on practical measurement available at the receiver. In Equation (13), $$\hat{\mu}_m = \frac{1}{L}\sum_{l=1}^{L} z_m^{(l)}, \text{ and } \hat{\sigma}_v^2 = \frac{1}{L}\sum_{l=1}^{L} |z_0^{(l)}|^2.$$

For the limiting case where N'=N, the value of $\varsigma$ from Equation (5) would be $\varsigma \approx N-1$ and the fractional received signal power, $\gamma$, would be $\gamma \approx 1$. If the delay estimates do not capture any signal energy at all, then $E[S] \to N'\sigma_v^2$, and $\gamma \to 0$. Similarly, adding extra delay estimates that do not correspond to any physical paths may also lead to a reduced value of the fractional received signal power $\gamma$. However, by setting a proper threshold on $\gamma$, the path searcher may be triggered when the delay estimates become out of date and capture too little of the available energy.

In many situations where the system performance is intra-cell interference-limited, the noise plus inter-cell interference term, which is the AWGN noise component $\sigma_n^2$, can be neglected. That is to say, if the intra-cell interference term is much greater than $\sigma_n^2$ then:

$$\sum_{i=1}^{N} |a_i|^2 \left(1 + \sum_k |p^{(k)}|^2 |v^{(k)}|^2\right) \gg \sigma_n^2, \quad (14)$$

or in other words, $\beta \approx 0$. In this case, the estimation of $\beta$ can be omitted and the fractional received power is given by $\gamma \approx N' - \varsigma$.

If the AWGN noise term $\sigma_n^2$ is actually not negligible ($\beta > 0$), then assuming that $\beta \approx 0$ may lead to underestimating the percentage of the received energy, which may result in more frequent path searcher re-runs. In that case, the threshold value of $\gamma$ may be adjusted adaptively to acount for the degree to which the relationship in Equation (14) is violated.

Note that the quality of the $\sigma_v^2$ estimates can be improved by probing several delays that do not correspond to a physical path, since the spreading code shifts are uncorrelated. Note also that the quality of the E[S] estimates can be improved by using more pilot symbols (e.g., estimating across transmit interval or slot boundaries). Note further that the quality of the output of each tuning finger $z_m$ depends on the variance of the interference estimates, i.e., the length of the averaging window, and the ratio of inter-cell interference and receiver noise power to the intra-cell interference power, or the precision of estimating this ratio. In general, long interference estimate averaging time and low inter-cell interference levels provide the most reliable decisions.

As demonstrated by the foregoing description, embodiments of the present invention provide a method and system for detecting a situation where it is likely that additional multipath components are available in the channel, but are not presently included in RAKE processing. Advantages of the invention include the use of a figure of merit that is computed in absolute terms instead of relative terms. Thus, a reliable comparison reference is not required, a regular testing schedule is not needed, and design assumptions about channel variation rates are not required. In addition, the path searcher triggering decision is based in part on the total received signal power, which is the parameter that has a direct effect on the experienced BLER. The invention can also be seamlessly combined with other event detection schemes with little or no significant modifications thereto.

While a limited number of embodiments have been disclosed herein, those of ordinary skill in the art will recognize that variations and modifications from the described embodiments may be derived without departing from the scope of the invention. For example, while embodiments of the invention have been described with respect to a WCDMA based mobile communication system, the principles and teachings of the invention can be adopted to any direct-sequence (DS) CDMA transmission system. Accordingly, the appended claims are intended to cover all such variations and modifications as falling within the scope of the invention.

What is claimed is:

1. A method of scheduling a multipath search of a channel in a RAKE receiver, the method comprising:
    estimating an average interference over a predefined time interval for each RAKE finger assigned a multipath component;
    summing the average interference estimates from the RAKE fingers;
    estimating a total interference plus noise for the channel;
    determining a figure of merit representing a fractional received signal power for the channel based on the summed average interference estimates and the total interference plus noise estimate; and
    initiating a multipath search if the figure of merit is below a predefined threshold.

2. The method according to claim 1, wherein the average interference estimate for each RAKE finger includes an intra-cell noise plus interference estimate and an inter-cell noise plus interference estimate.

3. The method according to claim 2, wherein the step of determining the figure of merit includes determining a fractional inter-cell noise plus interference estimate.

4. The method according to claim 3, wherein the step of determining the figure of merit further includes setting the fractional inter-cell noise plus interference estimate approximately equal to zero.

5. The method according to claim 3, wherein the step of determining the figure of merit further includes calculating an interference ratio based on the sum of the average interference estimates and the total noise plus interference estimate.

6. The method according to claim 5, wherein the step of determining the figure of merit further includes subtracting the interference ratio from the number of RAKE fingers assigned a multipath component.

7. The method according to claim 6, wherein the step of determining the figure of merit further includes multiplying the result of the subtraction by one plus the fractional inter-cell noise plus interference estimate to produce the figure of merit.

8. The method according to claim 1, wherein the total noise plus interference estimate is obtained from a RAKE finger which has no multipath component assigned.

9. The method according to claim 1, wherein the predefined threshold for the figure of merit is substantially between zero and one.

10. The method according to claim 1, wherein the predefined threshold for the figure of merit is adaptively adjusted.

11. A RAKE receiver in a mobile communication system, comprising:
    a path searcher module capable of searching a channel for multipath components;
    a RAKE finger module configured to assign a RAKE finger to each multipath component found by the path searcher module;
    an interference module capable of estimating an average interference over a predefined time interval for each RAKE finger assigned a multipath component and a total interference plus noise for the channel; and
    a control unit configured to control the path searcher module based on the average interference estimates from the interference module, the control unit including an interference estimation algorithm designed to:
        sum the average interference estimates for the RAKE fingers;
        determine a figure of merit representing a fractional received signal power for the channel based on the summed average interference estimates and the total interference plus noise estimate; and
        initiate a multipath component search if the figure of merit is below a predefined threshold.

12. The receiver according to claim 11, wherein the average interference estimated by the interference module for each RAKE finger includes an intra-cell noise plus interference estimate and an inter-cell noise plus interference estimate.

13. The receiver according to claim 12, wherein the determination of the figure of merit includes a determination of a fractional inter-cell noise plus interference estimate.

14. The receiver according to claim 13, wherein the determination of the figure of merit includes a setting of the fractional inter-cell noise plus interference estimate approximately equal to zero.

15. The receiver according to claim 13, wherein the determination of the figure of merit includes a calculating of an interference ratio based on the sum of the average interference estimates and the total noise plus interference estimate.

16. The receiver according to claim 15, wherein the determination of the figure of merit includes a subtracting of the interference ratio from the number of RAKE fingers assigned a multipath component.

17. The receiver according to claim 16, wherein the determination of the figure of merit includes a multiplying of the result of the subtraction by one plus the fractional inter-cell noise plus interference estimate.

18. The receiver according to claim 11, wherein the total noise plus interference estimated by the interference module is based on an output of a RAKE finger which has no multipath component assigned.

19. The receiver according to claim 11, wherein the predefined threshold for the figure of merit is substantially between zero and one.

20. The receiver according to claim 11, wherein the interference estimation algorithm is further designed to adaptively adjust the predefined threshold for the figure of merit.

* * * * *